Jan. 27, 1959  A. CHAUSSON  2,870,660
AUTOMATIC MACHINE FOR DRILLING SERIES OF HOLES IN VARIOUS PARTS
Filed April 5, 1957  6 Sheets-Sheet 1

Inventor
André Chausson
By Alvin Browdy
Attorney

Jan. 27, 1959 A. CHAUSSON 2,870,660
AUTOMATIC MACHINE FOR DRILLING SERIES OF HOLES IN VARIOUS PARTS
Filed April 5, 1957 6 Sheets-Sheet 4
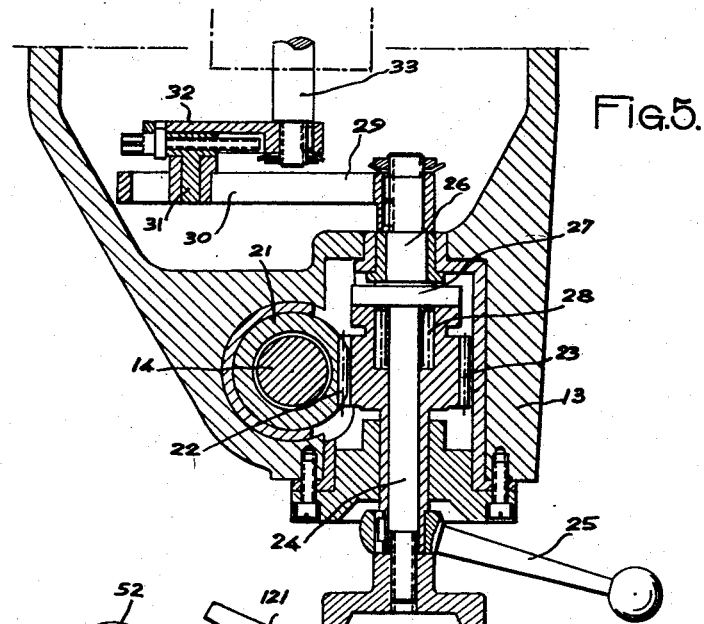
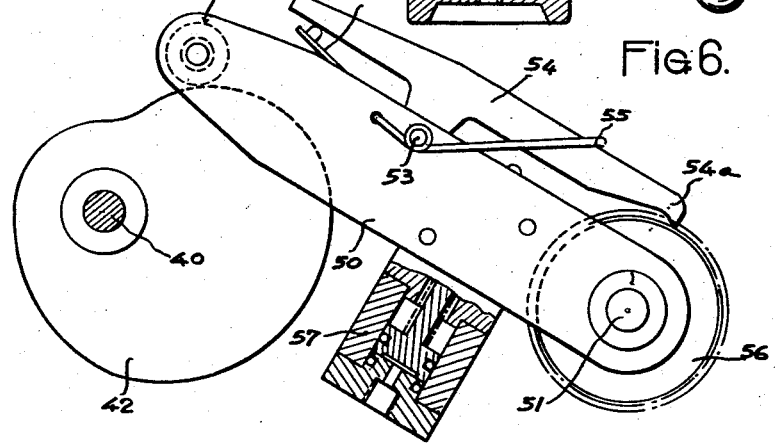
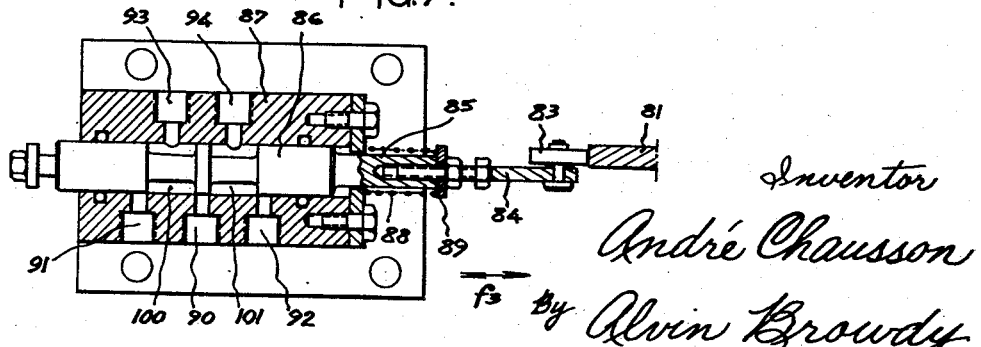
Inventor
André Chausson
By Alvin Browdy
Attorney

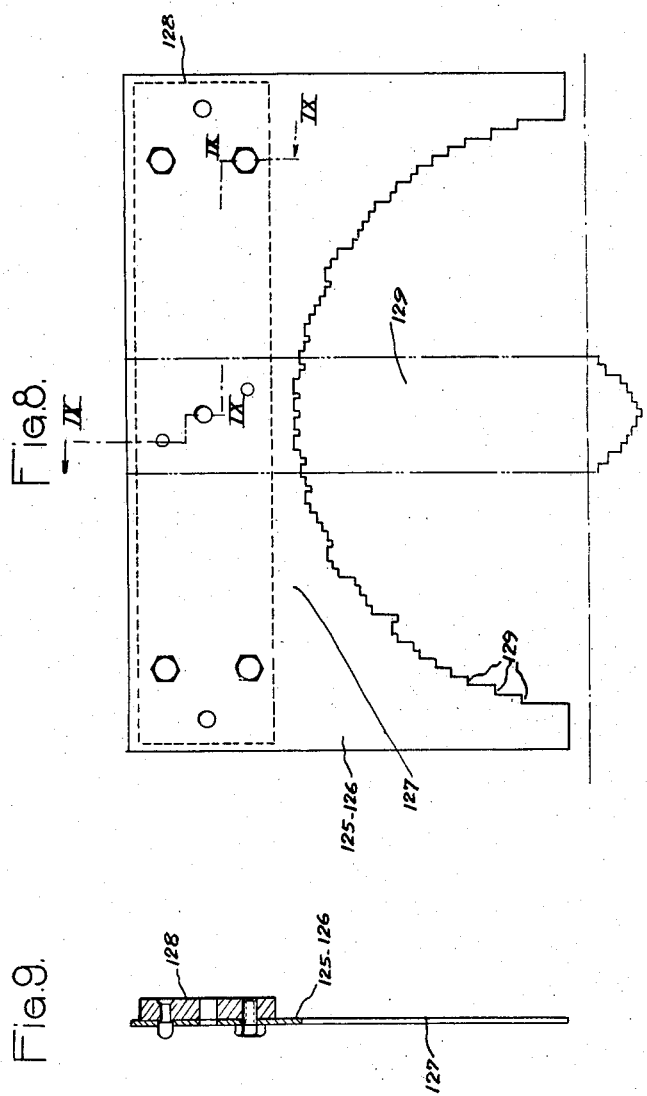

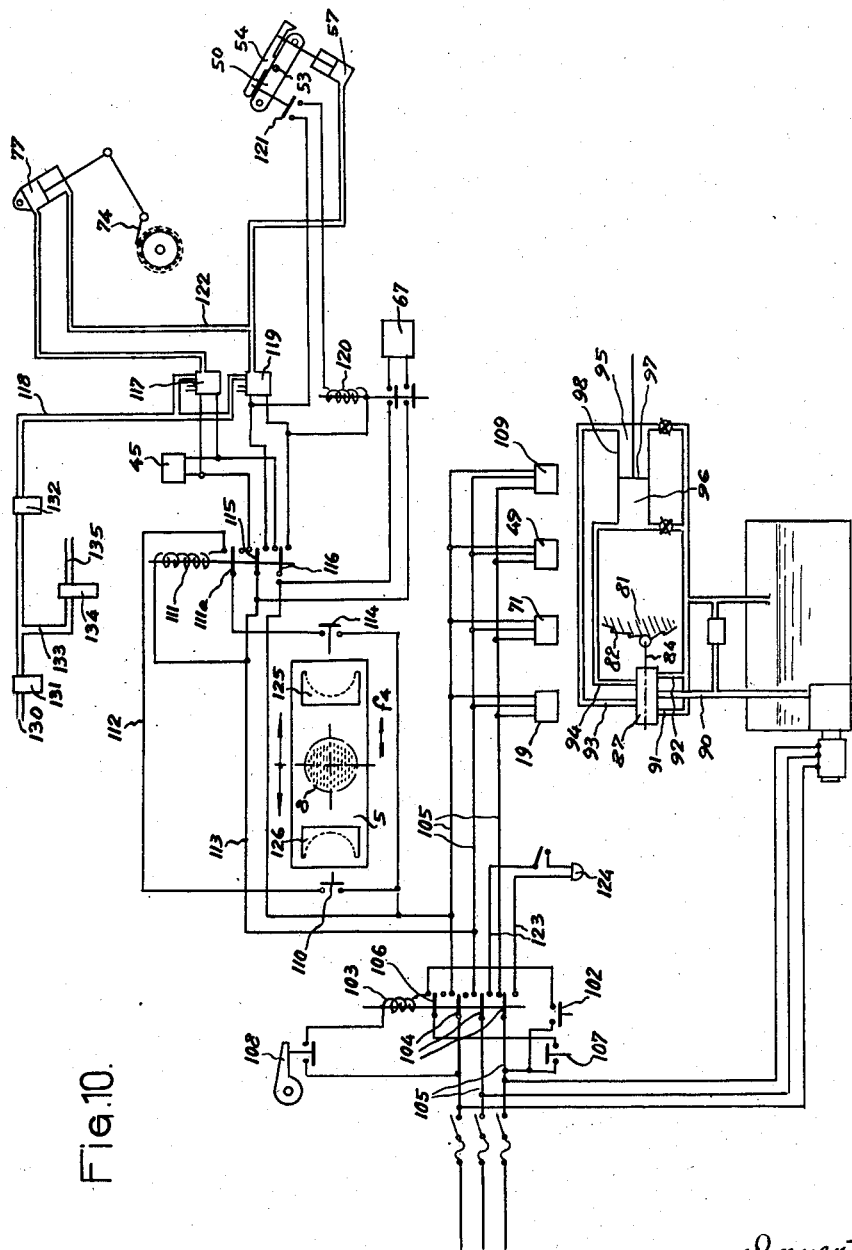

United States Patent Office 2,870,660
Patented Jan. 27, 1959

2,870,660

AUTOMATIC MACHINE FOR DRILLING SERIES OF HOLES IN VARIOUS PARTS

André Chausson, Asnieres, France, assignor to Societe Anonyme des Usines Chausson, Asnieres, France, a company of France Application April 5, 1957, Serial No. 650,975

Claims priority, application France April 14, 1956

5 Claims. (Cl. 77—32.2)

This invention relates to a machine to drill series of holes in various parts and in particular in tubular plates used in the manufacture of heat exchanger nests, especially for aircraft.

The main object of the invention is to provide a machine having a very great accuracy for the drilling of holes and further to allow the drilling of holes in various combinations according to the particular shape of the parts to be drilled. A further object of the invention is to provide an automatic machine the various parts of which are operated in time relation by means of easily interchangeable controlling members. For that purpose, the machine according to the invention for the automatic drilling of several series of holes in parallel relationship in pieces to be drilled comprises a fixed body, a sliding carriage carried by said body, a movable frame also carried by said body and movable transversely with respect to said sliding carriage and a drilling head carried by said movable frame, said machine being further provided with a pawl and ratchet-wheel mechanism having a driving control cam to operate said sliding carriage in an intermittent motion the amplitude of which is imparted by said cam and corresponds to the space separating the successive holes to be drilled in each row of holes, then a hydraulic operating system operated by said sliding carriage at the end of its stroke to drive said movable frame in time relation with said sliding carriage, said hydraulic operating system having a removable cam provided with a number of inclined teeth corresponding to the number of rows of holes to be drilled, so that the space separating the successive rows of holes is determined by said removable cam.

Numerous other characteristics of the invention will moreover be revealed by the following detailed description and claims.

One form of embodiment of a machine according to the invention is shown by way of non-restrictive example, in the attached drawings.

Figure 5 is a section, on a larger scale, taken along the line V—V of Fig. 2.

Figure 6 is an elevation partly broken away and on a larger scale, showing a detail partially viewable in dotted line in Fig. 1.

Figure 7 is a section, on a larger scale, taken along the line VII—VII of Fig. 2.

Figure 8 is a plan view, on a larger scale, showing a form of embodiment of an interchangeable controlling member viewable on Figure 1 in which it is designed by reference numerals 125—126.

Figure 9 is a section taken substantially along the line IX—IX of Fig. 8.

Figure 10 is a diagram showing the controlling circuits of the machine.

Figure 1:
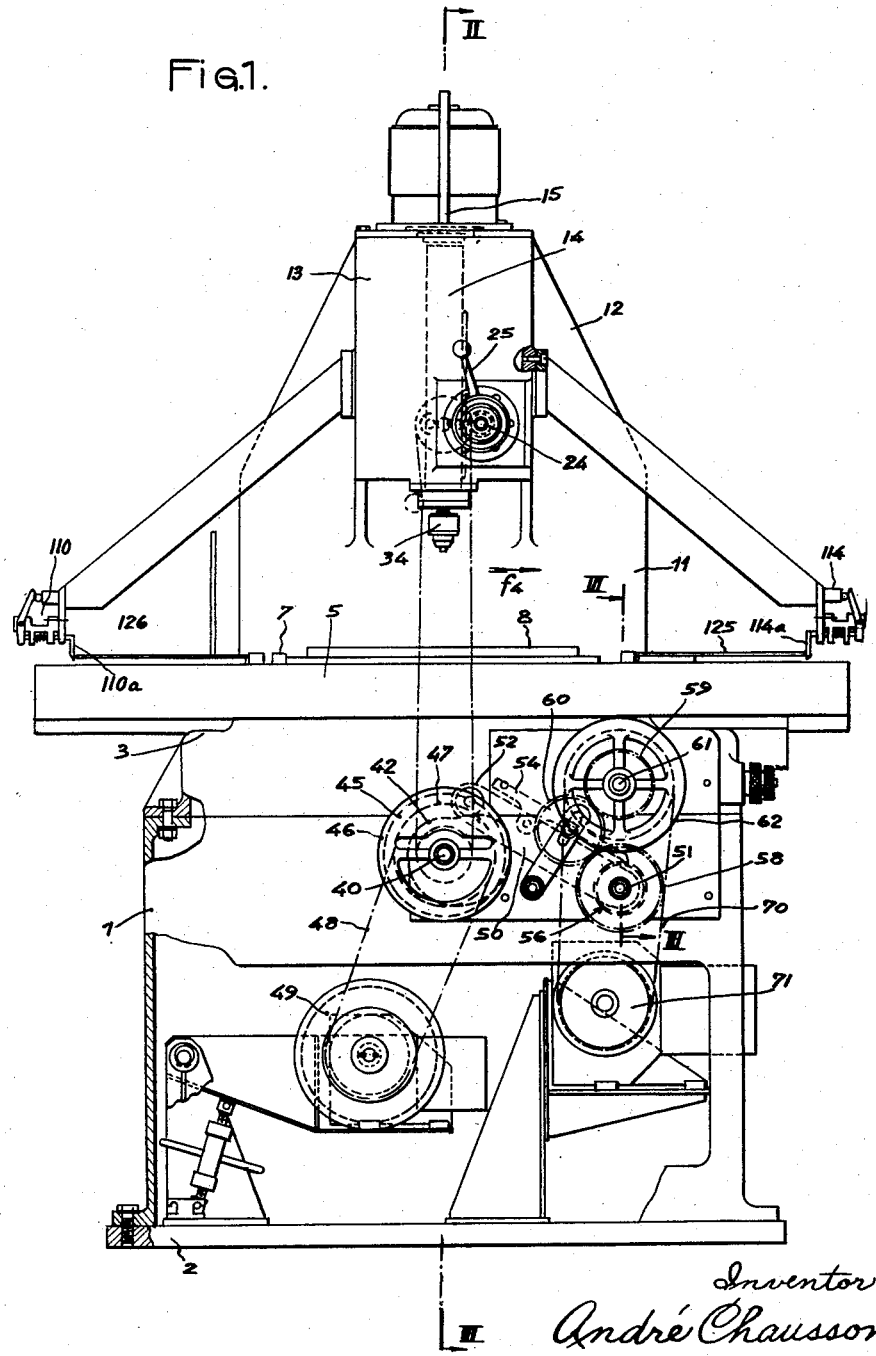
Figure 1 is a front elevation partially cut away of the machine according to the invention.

In the drawing, the machine comprises a frame 1 carried by a sole-plate 2.

Figure 2:
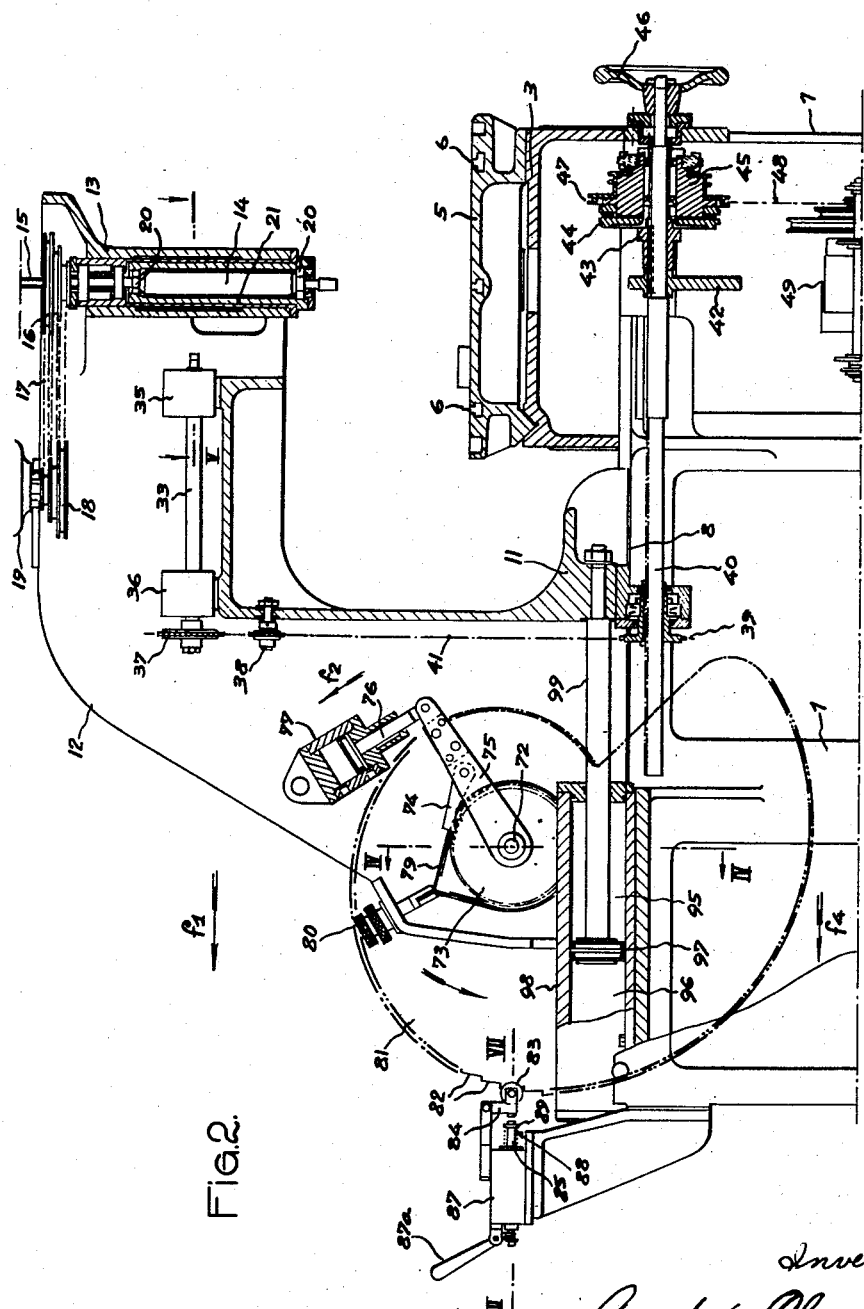
Figure 2 is a partial section taken substantially along the line II—II of Fig. 1.

On the front of the machine, shown to the right of Fig. 2, the frame is provided with a table 3 extending transversally to the longitudinal axis of the machine.

The top of the table 3 is provided with guiding members 4 supporting a carriage 5. The top of the carriage 5 has grooves 6 (Figs. 2 and 3) for the engagement of holding members 7 (Fig. 1) intended to secure the parts 8 to be drilled on the carriage 6, which parts may, for example, be a tubular plate of a heat exchanger or any other kinds of parts in which it is necessary to drill series of holes at well defined points.

Figure 4:
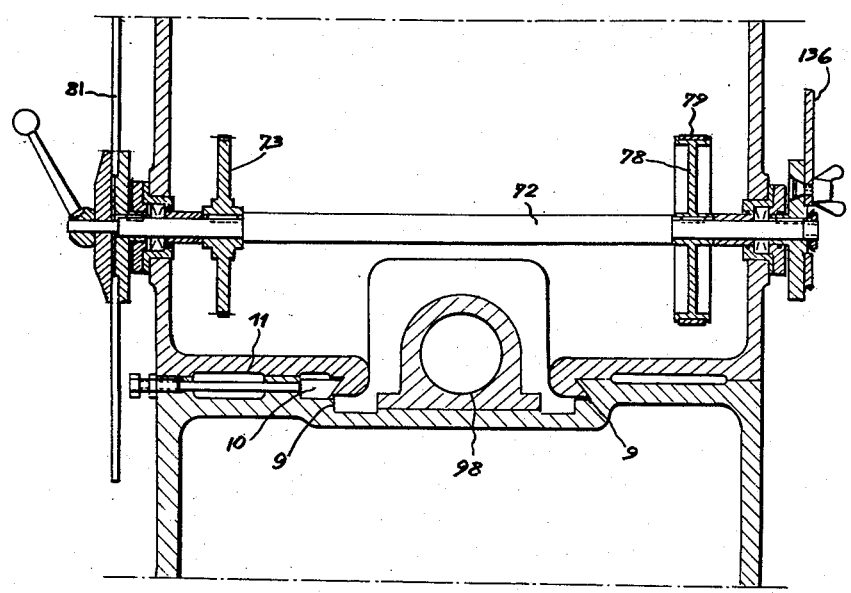
Figure 4 is a section, on a larger scale, taken along the line IV—IV of Fig. 2.

The frame 1, recessed from the table 3, forms guiding slides 9 extending perpendicularly to this table 3. The slides 9, which advantageously are provided with adjusting blocks 10, as shown in Fig. 4, are intended to maintain and guide a movable frame 11.

As described in the foregoing, the movable frame 11 is intended to be displaced during certain of the operating stages of the machine, perpendicularly to the movement of the carriage 5 which holds the part to be drilled. The movable frame 11 forms a bracket or swan-neck 12 which carries a drilling head 13 at its end (Figs. 1, 2 and 5).

The drilling head 13 comprises a chuck-holder shaft 14 with fluted end 15 on which is mounted a stepped pulley 16 connected by a belt 17 to a corresponding pulley 18 driven by a continuously revolving electric motor 19. The chuck-holder shaft 14 is connected by thrust ball bearings 20 to a bushing 21. The bushing 21 is mounted in the drilling head 13 so that it can slide vertically but cannot be rotatively driven. This bushing has a rack 22 (Fig. 5) meshing with a pinion 23. The pinion 23 is driven by a shaft 24 which can oscillate in one direction or the other by means of a hand control 25 or a mechanical control comprising a shaft 26 connected to the shaft 24 by a friction coupling 27 provided with resilient thrust members 28.

As shown in Fig. 5, the shaft 26 carries inside the drilling head, a crank 29 having a port 30 in which is engaged a crank-pin 31 carried by an arm 32 keyed to the end of a shaft 33 (Figs. 2 and 5).

As can be clearly seen, when the arm 33 revolves, the crank-pin 31 describes a revolving movement, which has the effect of alternately causing the shaft 26 and the shaft 24 to oscillate, and consequently, alternately to raise and lower the bushing 21 which controls the up and down movement of the shaft 14 carrying a chuck 34, as shown in Fig. 1.

The shaft 33 is mounted in bearings 35, 36 carried inside the swan-neck 12 and this shaft is driven by a chain-wheel 37 held taut by a sliding member 38 and wound on a driving pinion 39 angularly integral with a shaft 40 extending inside the fixed frame 1 of the machine. The driving pinion is mounted so as to be able to slide with respect to the shaft 40 in proportion to the displacements available to the movable frame 11 carrying said shaft 33. The shaft 40 as shown in Figs. 1 and 2, is keyed with a cam 42 located under the table 3, this cam is also viewable in Fig. 6. The cam 42 keyed on the shaft 40, is connected by a sleeve 43 to the armature 44 (Fig. 2) of an electromagnetic clutch 45 freely mounted on the shaft 40 whose end, projecting outside the frame 1, carries a handwheel 46.

The electro-magnetic clutch 45 is provided with a pulley 47 connected by a belt 48 to one of the pulleys of a continuously revolving motor 49.

Figure 3:
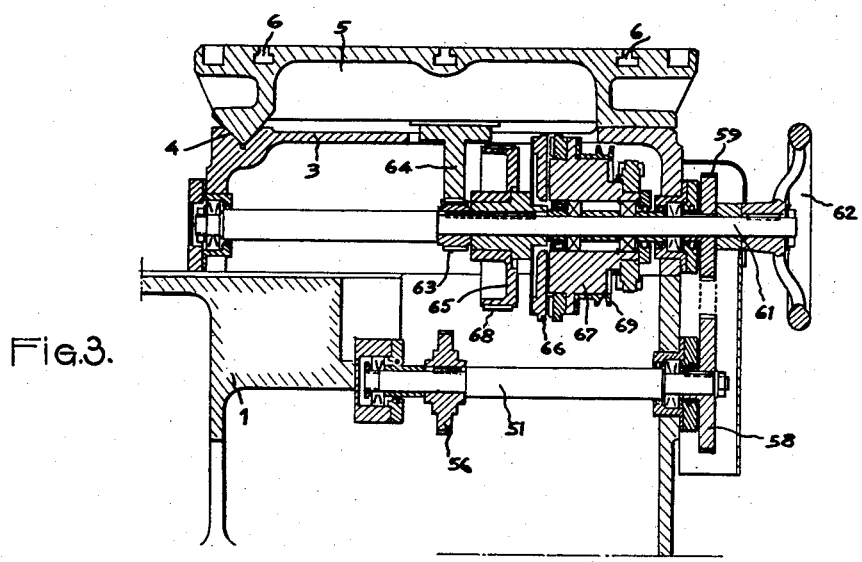
Figure 3 is a partial section taken along the line III—III of Fig. 1.

The cam 42 is shaped so that it causes a lever 50 to oscillate. This lever is pivotally mounted by one of its ends on a shaft 51 (Figs. 1, 3 and 6). The other end of the lever 50 is provided with a roller 52 bearing on the profile of the cam 42.

As shown in Fig. 6, the lever 50 carries, by an axle 53, on which a pawl 54 is pivotally mounted and a spring 55 urges said pawl, so that it bears by its end 54a on the teeth of a pinion 56 keyed on the shaft 51.

57 designates a pneumatically controlled jack, which is intended in certain cases as thereafter related to keep the pawl 54 raised to enable the pinion 56 to rotate freely.

As can be seen from the foregoing, when the shaft 40 is rotatively driven either by the handwheel 46 revolved by hand, or by the motor 49 when the electro-magnetic clutch 45 is energized, the movement of said shaft is transmitted to the pinion 39 (Fig. 2). The rotation of this pinion 39 is transmitted, as explained above to the crank 30 (Fig. 5) controlling the up-and-down movement of the chuck-holder shaft 14. For each complete revolution of the shaft 40, corresponds to a complete cycle of the chuck-holder shaft 14, i. e., and up-and-down movement of this shaft, and hence, the drilling of a hole.

The cam 42 being keyed on to the shaft 40, for each revolution of the latter it rotates 360°, and hence, the lever 50 makes a complete cycle, so that for each revolution of the shaft 40, the pinion 56 makes an angular movement which is imparted to it by the pawl 54.

The magnitude of the angular movement of the pinion 56, and hence of the shaft 51 that carries it, is defined by the number of teeth on this pinion and by the profile of the cam 42. It is thus possible, by acting more particularly on the profile of the cam 42 which is obtained by interchanging cams to make the pinion 56 revolve to an extent corresponding to one, two or more of its teeth.

As shown more particularly in Figs. 1 and 3, the shaft 51 carries a second pinion 58 which transmits the movement that it receives to a pinion 59 by means of an intermediate pinion 60 viewable only in Fig. 1. The pinion 59 is keyed on a shaft 61 carrying a handwheel 62 and a pinion 63 (Fig. 3). The pinion 63 meshes with a rack 64 integral with the carriage 5 intended to slide on the table 3.

In addition to the members described above, the shaft 61 carries a drum 65 and the armatures 66 of an electro-magnetic clutch 67. The drum 65 co-operates with a friction band 68 making a brake limiting the displacement of the rack 64 to the extent imperatively imposed on it by the shaft 61 receiving an impulse for each revolution of the shaft 40.

The electro-magnetic clutch 67 is connected to a pulley 69 in which a belt 70 is passed to transmit the movement of the output shaft of an electric motor 71.

The windings of the electro-magnetic clutch 67 not being normally fed, this clutch does not attract its armature 66 and hence it revolves freely on the shaft 61 even if the motor 71 revolves continuously. The cyclic movement, in which the pinion 56 is driven by the pawl 54, is integrally transmitted to the shaft 61, and consequently, for each revolution of the cam 42 the shaft 61 revolves by an angle sufficient to move forward, by means of a pinion 63, the carriage 5 to a determined distance corresponding to the space that must separate two holes to be drilled in the part carried by this carriage 5.

The forward movement of the carriage being controlled by a gear and ratchet device, it is easy to make certain that there is a drive between the carriage and the motive members without clearance, and hence it is possible to secure great accuracy in the spaces separating the successive holes to be drilled.

The movement to which the carriage is subjected, as explained above, allows it to carry out the drilling of a row of holes lined up with each other. When a perforation row is completely finished, the carriage is returned backwards at relatively high speed by means of the belt 70 driven by the motor 71 which transmits its movement to the shaft 61 by the electro-magnetic clutch 67, which, at this moment, is fed.

This latter operation which is driven and controlled like that explained above, is carried out in time relation to the displacement in the direction of the arrow $f_1$ (Fig. 2) of the movable frame 11. The displacement of the movable frame is intended to bring the drill carried by the chuck 34 into the vertical plane passing through the row of a fresh set of perforations to be carried out.

The movable frame carries transversally a shaft 72 on to which is keyed a pinion 73 (Figs. 2 and 4) whose teeth are engaged by a pawl 74 carried by a pivoting arm 75 pivotally mounted on the shaft 72 and controlled by the piston rod 76 of a jack 77. The shaft 72 also carries a drum 78 on which a friction band is wound 79 which can be more or less taut by means of members 80 so that the movement of the shaft 72 is always braked.

81 designates a cam which is fitted and secured on the shaft 72. The peripheric edge of the cam 81 has inclined teeth 82 intended successively to act for bearing on a roller 83 carried by a push-rod 84 bearing against the end 85 of the slide-valve 86 of a distributor 87 (Figs. 2 and 7).

88 designates a spring inserted between the distributor body 87 and an abutment 89 of its slide-valve 86 so that this slide-valve is always in contact with the push-rod 84. The distributor body 87 comprises an inlet duct 90 for oil under pressure, two outlet ducts 91, 92 for returning this oil to the tank and two ducts 93, 94 respectively connected to compartments 95, 96 delimited by the piston 97 of a jack 98 carried by the fixed frame 1 of the machine.

The piston 97 of the jack 98 is connected by a rod 99 to the movable frame 11. The length of the cavities 100 and 101 delimited in the distributor by the slide-valve 86 is selected so that there is a slight leak between the input duct 90 and the output ducts 91 and 92, when the slide-valve is in the position shown.

This arrangement automatically ensures the balancing of the slide-valve and affords rigorously equal pressures in the ducts 93 and 94 and hence in the compartments 95 and 96 of the jack 98, which has the effect of not submitting the piston 97 to any impulse.

As can be seen from the preceding description, when the jack 77 (Fig. 2) is fed so that its piston rod is displaced in the direction of the arrow $f_2$, the pawl 74 revolves the pinion 73 by a certain number of degrees. Then the cam 81 revolves to the same extent and consequently a fresh tooth 82 is brought opposite to the roller 83. The teeth 82 of the cam 81 are cut so that they are successively recessed from each other and this to an extent corresponding to the distance which must separate two rows of holes to be drilled in the part carried by the machine.

Seeing that the tooth brought opposite to the roller 83 is set back in relation to the tooth with which this roller was in contact, it follows that the spring 88 of the slide-valve 86 urges the latter so that the roller 83 comes again in contact with the tooth brought in front of it. This action of the spring 88 (Fig. 7) moves the slide-valve 86 in the direction of the arrow $f_3$. The input duct 90 for the oil under pressure is thus put into communication with the duct 93. The oil arriving in the compartment 95 of the jack 96 thrusts the piston 97 in the direction of the arrow $f_4$ (Fig. 2).

The movement of the piston is transmitted by the rod 99 to the movable frame 11 and thence to the cam 81 of which the tooth in front of the roller 83 thrusts this roller and consequently the slide-valve 86 until the moment when the latter re-occupies the position shown in Fig. 7. At this moment, the pressures are again equal in the compartments 95 and 96 of the jack 98 and the movable frame 11 is brought into a well defined position in which it is held, seeing that the leak provided between the compartments 100 and 101 and the output ducts 91 and 92 of the distributor have a delivery that is distinctly less than the input duct 90 can have, which has the effect of maintaining the compartments 95 and 96 of the jack under pressure.

The diagram of Fig. 10 clearly explains the succession of the various operations described above.

When the machine is required to be started up, the operator presses on the button 102, which has the effect of ensuring the feed of a relay 103 closing the switches 104 controlling the electric feed leads 105. The relay 103 also closes when energized a plate 106 intended to ensure its self-feed when the operator stops pressing the button 102.

The circuit of the feed leads 105 can, when so desired, be again opened by cutting the self-excitation of the relay 103 by means of a push-button 107. The self-excitation of the relay 103 is also controlled by a telemechanical contact 108 which is activated when the machining of a part is quite finished, for example by means of a cam 136 (Fig. 4) which is provided with a terminal tooth shaped so that it engages the contact 108. The leads 105 have the effect of ensuring the continuous feed of the motor 19 controlling the rotation movement of the chuck-holder shaft 14, the motor 71 controlling the speedy return of the carriage 5, the motor 49 ensuring the advance, step by step, of the carriage 5 by means of the ratchet mechanism of Fig. 6 and of a motor 109 intended to control a pump (not shown) controlling the spraying of lubricant.

When the part 8 to be drilled is fixed on the carriage 5, the latter is in a position where it closes a switch 110 ensuring the feed of a relay 111 by means of conductors 112 and 113 connected to the feed leads 105.

A second switch 114 also intended to be operated by the carriage 5 is also closed at this moment, so that the current is taken to the plate 111a of the relay 111. The relay 111, being fed like that explained above, attracts the plate 111a as well as two plates 115 and 116 intended to ensure the feed of the electro-magnetic clutch 45 when the relay 111 is energized.

The electro-magnetic clutch 45 being fed, the movement of the motor 49 is transmitted to the shaft 40, so that the cam 42 is rotatively driven and controls the rachet mechanism of Fig. 6 ensuring the advance, step by step, of the carriage 5 in synchronism with the up-and-down movement of the chuck-holder shaft 14.

The resulting displacement of the carriage 5 in the direction of the arrow $f_4$ (Fig. 10) has the effect of opening the switch 110 but the relay 111 does not drop because it is self-energized by its plate 111a.

The feed of the electro-magnetic clutch 45 corresponds to that of an electro-magnetically controlled valve 117 which has the effect of connecting one of the sides of the jack 77 operating the cam 81 with a compressed air intake pipe 118. When the electro-magnetically controlled valve 117 is fed, the piston of the jack 77 is in the position shown in Fig. 2 and consequently the cam 81 is kept motionless.

At the end of its first stroke the carriage 5 engages the switch 114 and opens it so that the relay 111 is no longer fed and drops, which has the effect of bringing the plates 115 and 116 into a position for which the electro-magnetically controlled valve 119 is fed.

The feed of the circuit of the electromagnetically controlled valve 119 has the effect of simultaneously ensuring the feed of a relay 120 which closes the excitation circuit of the electro-magnetic clutch 67. Seeing that this clutch is fed, the movement of the motor 71 is transmitted by the belt 70 to the shaft 61 and hence the carriage 5 is moved in the direction opposite to that of the arrow $f_4$ (Fig. 10) which corresponds to its return stroke.

The feed of the relay 120 only takes place, however, when its circuit is closed by a contact 121 controlled by the pawl 54 which is intended to ensure the slow forward movement of the carriage 5. The pawl 54 closes the contact 121 when it is raised i. e., at the time of admission of compressed air into the jack 57 controlled by an electro-magnetic valve 119.

As can be seen from the foregoing, the rapid return movement of the carriage 5 can only occur when the pawl 54 is raised by the rod of the jack 57.

The energization of the electro-magnetic valve 119 also has the effect, by means of a piping 122, of feeding the jack 77 in the direction for which its piston is displaced according to the arrow $f_2$ (Fig. 2). In this manner, the cam 81 is turned at an angle sufficient so that a new tooth 82 is brought opposite to the roller 83 carried by the push-rod 84 controlling the slide-valve 85 of the distributor 87.

The displacement in the direction of the arrow $f_1$ of the movable frame 11 thus takes place at the same time as the displacement in the direction of rapid return of the carriage 5.

Seeing that in the latter defined position of the plates 115 and 116 the electro-magnetic clutch 45 is not fed, the shaft 40 controlling the up-and-down movement of the chuck-holder shaft 14 is not driven and hence this chuck-holder shaft is kept raised.

At the end of the rapid return movement of the carriage 5, the latter again closes the switch 110, which has the effect of energizing again the relay 111 and consequently of bringing the plates 111a and 115, 116 into the first position studied above, so that the machine begins a new series of perforations. When all the perforations are drilled in the part 8 the switch 108 is lowered by the cam 136. This switch cuts out the feed of the relay 103 whose plates 104 fall while a conductor 123 controlling an alarm bell 124 is fed thus notifying the operator that the machine is stopped.

At this moment, the part 8 is withdrawn, then replaced by a new non-perforated part, and the machine is brought back to the working position by the operator who can act on the distributor 87 by means of a handle 87a intended to move the slide-valve by hand for bringing the movable frame 11 back to its original position.

In many cases, the number of holes to be drilled in a part is not the same for each row of holes. For this reason, the carriage 5 carries abutting members 125, 126 placed on both sides of the part 8, as shown in Figs. 1, 8 and 9, said abutting members comprising a plate 127 carried by a base part 128 intended to be fixed on top of the carriage 5. The plates 127 are cut so as to provide teeth 129 whose width corresponds to the space separating two consecutive rows of perforations to be drilled.

The height of the successive teeth is determined by the position of the terminal holes to be drilled in each row.

As can be easily understood when the carriage is moved in the direction of the arrow $f_4$ (Figs 1 and 10) at a given moment one of the teeth of the abutting member 125 engages the abutment 114a of the switch 114 and hence operates the latter for bringing about the operations described above at the end of the slow advance of the carriage. Reciprocally, when the corresponding tooth of the abutting member 126 engages the abutment 110a of the switch 110, at the end of the rapid return stroke, the operations controlled by this switch are carried out.

The abutting members 125 and 126 are provided with removable supplementary plates 129 as shown in broken lines in Fig. 8, this in the case where perforations are not required to be made at certain points of the part 8 and more particularly near to its centre. The supplementary plates 129 are preferably connected to the plates 125 or 126 so as to be easily removable, seeing that these supplementary plates must be put into position and then withdrawn during drilling operations, when only a space in the middle part of the part 8, for example, must be free of perforations.

As shown in Fig. 10, the compressed air circuit, led in by a piping 130 and more particularly intended to effect the control of the jacks 57, 77 is also used for lubricating the various movable members of the machine.

For this, an air purifying device 131 is fitted on the intake piping 130; then the members 132 intended to charge oil into the air brought to the electro-magnetic butterfly valves 117 and 119 are mounted below the purifying device 131. Moreover, a branch pipe 133 connected below the purifying device 131 leads to an atomiser 134 whose output pipe 135 is intended to feed the various lubrication pipings of the machine (not shown).

Various other modifications can be applied to the example of embodiment shown and described in detail, without going outside of its scope.

I claim:

1. A machine of the character described for the automatic drilling of several series of holes in parallel relationship in pieces to be drilled comprising a fixed body, a sliding carriage for said piece to be drilled carried by said body, a movable frame also carried by said body and movable transversely with respect to said sliding carriage and a drilling head carried by said movable frame; said machine being further provided with a pawl and ratchet-wheel mechanism having a driving control cam to operate said sliding carriage in an intermittent motion the amplitude of which is imparted by said cam and corresponds to the space separating the successive holes to be drilled in each row of holes, then a pressure activated operating system operated by said sliding carriage at the end of its stroke to drive said movable frame in time relation with said sliding carriage, said pressure activated operating system having a removable cam provided with a number of inclined teeth corresponding to the number of rows of holes to be drilled so that the space separating the successive rows of holes is determined by said removable cam.

2. A machine as set forth in claim 1, comprising a shaft mounted in said fixed body and on which is keyed said control cam for the pawl and ratchet-wheel mechanism, a slidably mounted pinion on said shaft, a second shaft carried by said movable frame and parallelly disposed with respect to said first mentioned shaft, connecting members to connect together said slidably mounted pinion and said second shaft and an operating crank system driven by said second shaft to operate said drilling head in an up and down movement in time relation with the intermittent motion imparted by said control cam of the pawl and ratchet-wheel mechanism.

3. A machine as set forth in claim 1, comprising a set of two removable toothed abutting members carried by said sliding carriage on both sides of said piece to be drilled, said members having offset teeth the number of which corresponds to the number of rows of holes to be drilled in said piece and said teeth being offset according to a law which is defined by the location of terminal holes to be drilled in said piece, then at least two engaging members controlling said pressure activated operating system carried by said removable frame to engage successively said teeth of the toothed abutting members so that said movable frame and said slidable carriage are operated in time relation.

4. A machine as set forth in claim 3 in which said toothed abutting members each comprise at least two toothed plates having connecting members to connect them together.

5. A machine as set forth in claim 3, comprising further an electromagnetic valve connected to an air pressure source and activated by one of said engaging members, a jack operated by said electromagnetic valve and connected to said pawl and ratchet-wheel mechanism to bring it in a non-active position when operated and a driving device also controlled by said engaging members to drive said slidable carriage at high speed so that said slidable carriage is alternately moved in an intermittent slow movement by said pawl and ratchet-wheel mechanism and in a rapid movement by said driving device.

References Cited in the file of this patent

UNITED STATES PATENTS 1,905,094     Hirvonen _____ Apr. 25, 1933